(12) United States Patent
Salter et al.

(10) Patent No.: US 9,393,905 B2
(45) Date of Patent: Jul. 19, 2016

(54) PHOTOLUMINESCENT VEHICLE COMPARTMENT LIGHT

(71) Applicant: Ford Global Technologies, LLC, Dearborn, MI (US)

(72) Inventors: Stuart C. Salter, White Lake, MI (US); Vichit Chea, Berkley, MI (US); James J. Surman, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 12 days.

(21) Appl. No.: 14/615,022

(22) Filed: Feb. 5, 2015

(65) Prior Publication Data

US 2015/0146445 A1  May 28, 2015

Related U.S. Application Data

(63) Continuation-in-part of application No. 14/086,442, filed on Nov. 21, 2013.

(51) Int. Cl.
| | |
|---|---|
| *B60Q 1/00* | (2006.01) |
| *B60Q 1/26* | (2006.01) |
| *B60Q 11/00* | (2006.01) |
| *B60Q 3/06* | (2006.01) |
| *F21S 8/10* | (2006.01) |
| *B60Q 1/52* | (2006.01) |
| *B60Q 3/00* | (2006.01) |

(52) U.S. Cl.
CPC .. *B60Q 3/06* (2013.01); *B60Q 1/52* (2013.01); *B60Q 3/008* (2013.01); *F21S 48/00* (2013.01)

(58) Field of Classification Search
CPC ............ B60Q 3/008; B60Q 3/06; F21K 9/56; H05B 37/0218; H05B 37/0227
USPC .......................... 362/487, 496, 502, 509–510
See application file for complete search history.

(56) References Cited

U.S. PATENT DOCUMENTS

| | | | |
|---|---|---|---|
| 5,709,453 | A | 1/1998 | Krent et al. |
| 6,729,738 | B2 | 5/2004 | Fuwausa et al. |
| 6,773,129 | B2 | 8/2004 | Anderson, Jr. et al. |
| 6,851,840 | B2 | 2/2005 | Ramamurthy et al. |
| 6,871,986 | B2 | 3/2005 | Yamanaka et al. |
| 6,990,922 | B2 | 1/2006 | Ichikawa et al. |
| 7,213,923 | B2 | 5/2007 | Liu et al. |
| 7,264,366 | B2 | 9/2007 | Hulse |
| 7,264,367 | B2 | 9/2007 | Hulse |
| 7,441,914 | B2 | 10/2008 | Palmer et al. |
| 7,745,818 | B2 | 6/2010 | Sofue et al. |
| 7,753,541 | B2 | 7/2010 | Chen et al. |

(Continued)

FOREIGN PATENT DOCUMENTS

| | | |
|---|---|---|
| CN | 201169230 Y | 12/2008 |
| CN | 101337492 A | 1/2009 |

(Continued)

*Primary Examiner* — Jason Moon Han (74) *Attorney, Agent, or Firm* — Jason Rogers; Price Heneveld LLP (57) ABSTRACT

A lighting system for a vehicle is disclosed. The system comprises a photoluminescent portion disposed on an inner surface of a closure of a compartment. A light source is located proximate the closure. The light source is configured to emit an excitation emission at a first wavelength directed toward the photoluminescent portion. The photoluminescent portion is configured to convert the first wavelength to at least a second wavelength longer than the first wavelength.

15 Claims, 8 Drawing Sheets

(56) References Cited

U.S. PATENT DOCUMENTS

| | | |
|---|---|---|
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,071,988 B2 | 12/2011 | Lee et al. |
| 8,203,260 B2 | 6/2012 | Li et al. |
| 8,286,378 B2 | 10/2012 | Martin et al. |
| 8,408,766 B2 | 4/2013 | Wilson et al. |
| 8,421,811 B2 | 4/2013 | Odland et al. |
| 8,466,438 B2 | 6/2013 | Lambert et al. |
| 8,519,362 B2 | 8/2013 | Labrot et al. |
| 8,606,430 B2 | 12/2013 | Seder et al. |
| 8,624,716 B2 | 1/2014 | Englander |
| 8,631,598 B2 | 1/2014 | Li et al. |
| 8,683,722 B1 | 4/2014 | Cowan |
| 8,724,054 B2 | 5/2014 | Jones |
| 8,773,012 B2 | 7/2014 | Ryu et al. |
| 2002/0159741 A1 | 10/2002 | Graves et al. |
| 2002/0163792 A1 | 11/2002 | Formoso |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2007/0032319 A1 | 2/2007 | Tufte |
| 2007/0285938 A1 | 12/2007 | Palmer et al. |
| 2009/0219730 A1 | 9/2009 | Syfert et al. |
| 2009/0251920 A1 | 10/2009 | Kino et al. |
| 2012/0001406 A1 | 1/2012 | Paxton et al. |
| 2012/0280528 A1 | 11/2012 | Dellock et al. |
| 2013/0335994 A1 | 12/2013 | Mulder et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2016/0016506 A1 | 1/2016 | Collins et al. |

FOREIGN PATENT DOCUMENTS

| | | |
|---|---|---|
| CN | 201193011 Y | 2/2009 |
| DE | 29708699 U1 | 7/1997 |
| DE | 10319396 A1 | 11/2004 |
| DE | 202006004164 U1 | 8/2007 |
| EP | 1793261 A1 | 6/2007 |
| EP | 2778209 A1 | 9/2014 |
| JP | 2000159011 A | 6/2000 |
| JP | 2007238063 A | 9/2007 |
| WO | 9734779 A1 | 9/1997 |
| WO | 2006047306 A1 | 5/2006 |
| WO | 2014068440 A1 | 5/2014 |

PHOTOLUMINESCENT VEHICLE COMPARTMENT LIGHT

CROSS-REFERENCE TO RELATED APPLICATION

This application is a continuation-in-part of U.S. patent application Ser. No. 14/086,442, filed Nov. 21, 2013, and entitled "VEHICLE LIGHTING SYSTEM WITH PHOTOLUMINESCENT STRUCTURE." The aforementioned related application is hereby incorporated by reference in its entirety.

FIELD OF THE INVENTION

The present disclosure generally relates to vehicle lighting systems, and more particularly, to vehicle lighting systems employing photoluminescent structures.

BACKGROUND OF THE INVENTION

Illumination arising from photoluminescent materials offers a unique and attractive viewing experience. It is therefore desired to incorporate such photoluminescent materials in portions of vehicles to provide ambient and task lighting.

SUMMARY OF THE INVENTION

According to one aspect of the present disclosure, a lighting system for a vehicle is disclosed. The system comprises a photoluminescent portion disposed on an inner surface of a closure of a compartment. A light source is located proximate the closure. The light source is configured to emit an excitation emission at a first wavelength directed toward the photoluminescent portion. The photoluminescent portion is configured to convert the first wavelength to at least a second wavelength longer than the first wavelength.

According to another aspect of the present disclosure, a lighting system for a compartment of a vehicle is disclosed. The system comprises at least one photoluminescent portion disposed on an inner surface of a closure. At least one light source is disposed proximate an outer portion of the compartment. The light source is configured to emit light at a first wavelength. The photoluminescent portion is configured to convert the first wavelength to at least a second wavelength longer than the first wavelength to illuminate the compartment.

According to yet another aspect of the present disclosure, a lighting system for a compartment of a vehicle is disclosed. The system comprises at least one photoluminescent portion disposed on an inner surface of a closure. At least one light source is disposed proximate an outer portion of the compartment. The light source is configured to emit light at a first wavelength. The photoluminescent portion is configured to convert the first wavelength to at least a second wavelength longer than the first wavelength and emit the second wavelength toward the compartment.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a lighting system for a vehicle configured to illuminate at least a portion of an engine compartment. In some implementations, a light source may be configured to illuminate a first photoluminescent portion corresponding to a utility light. The light source may further be configured to illuminate a second photoluminescent portion corresponding to at least one engine compartment feature, component, fluid reservoir, and/or any other portion of the vehicle located proximate the engine compartment. In various implementations, the first photoluminescent portion may correspond to a functional lighting unit configured to illuminate the engine compartment. The second photoluminescent portion may correspond to an additional lighting unit configured to illuminate at least one engine compartment.

Figure 1:
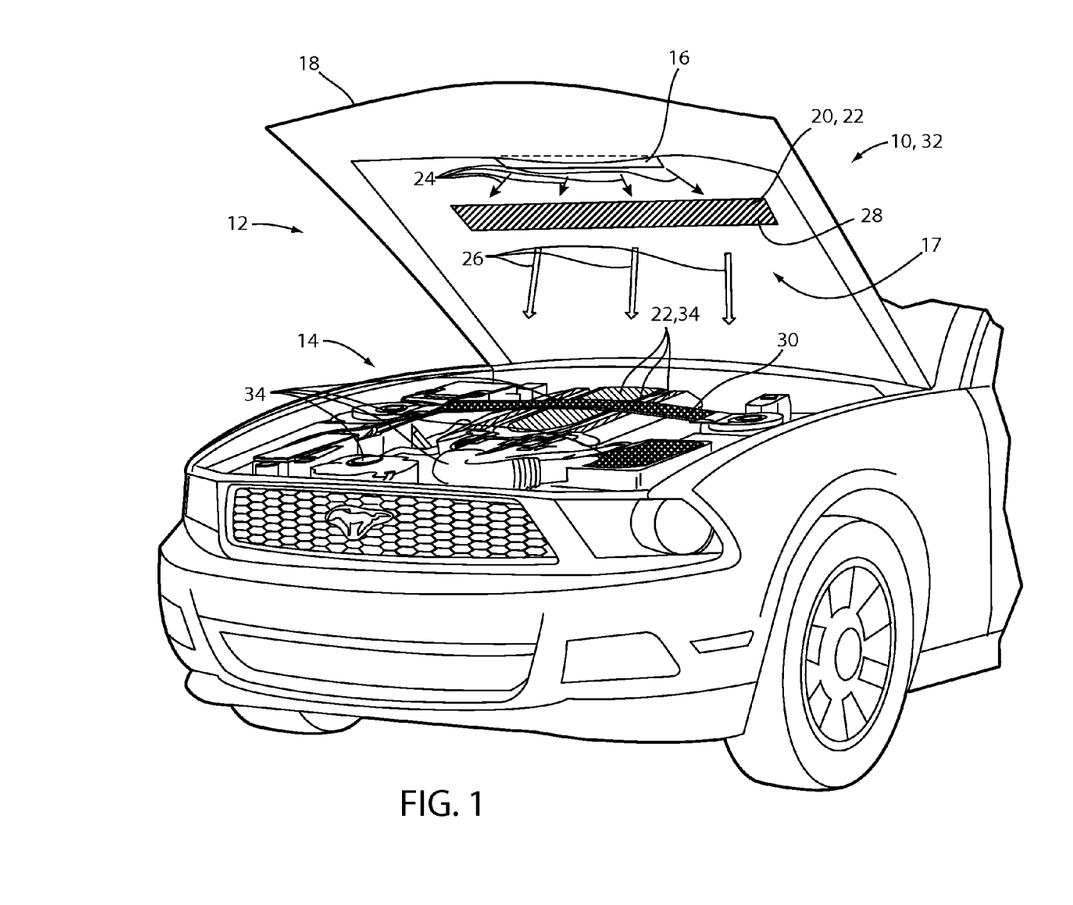
FIG. 1 is a perspective view of a vehicle comprising a lighting system.

Referring to FIG. 1, a perspective view of a vehicle 10 is shown demonstrating a lighting system 12 configured to illuminate at least a portion of an engine compartment 14. The lighting system 12 comprises a light source 16 disposed on an interior surface 17 of a closure 18 and at least one photoluminescent portion 20. As discussed herein, the closure may correspond to a cover, lid, or door configured to enclose an opening of the vehicle 10. In exemplary embodiments, the closure 18 may refer at least one of a vehicle hood configured to enclose an engine compartment and/or a deck lid, trunk lid configured to enclose a cargo compartment. In some embodiments, the closure 18 may correspond to a hatch or door of a vehicle.

In some implementations, the at least one photoluminescent portion 20 may comprise a plurality of photoluminescent portions 22. The light source 16 is configured to output a first emission 24 corresponding to a first wavelength of light. In response to receiving the light at the first wavelength, the plurality of photoluminescent portions 22 may become illuminated and emit at least a second emission 26 having a second wavelength of light longer than the first wavelength.

The plurality of photoluminescent portions 22 may correspond to any number of features located in the engine compartment 14 and disposed on the interior surface 17 incorporating at least one photoluminescent structure. In an exemplary implementation, the lighting system 12 comprises a first photoluminescent portion 28 and a second photoluminescent portion 30. The first photoluminescent portion 28 may correspond to a utility light 32 configured to emit a high intensity light to illuminate the engine compartment 14. The second photoluminescent portion 30 may correspond to at least one feature 34 located in the engine compartment. The second photoluminescent portion 30 may be configured to illuminate the at least one feature 34 to provide an ambient glow emitted from the at least one feature 34.

Each of the plurality of photoluminescent portions 22 may incorporate one or more photoluminescent structures configured to emit a specific color in response to the excitation generated in response to the first emission 24. In some implementations, a combination of photoluminescent structures may be utilized in the photoluminescent portions 22 to output various wavelengths corresponding to different colors of light. For example, in some implementations the utility light 32 may be configured to emit a combination of red light, green light, and blue light to generate a light having a substantially white appearance. The lighting system 12 may provide various benefits including a cost-effective method for illuminating an engine compartment and incorporating ambient lighting to at least one feature 34 proximate the engine compartment 14.

Figure 2A:
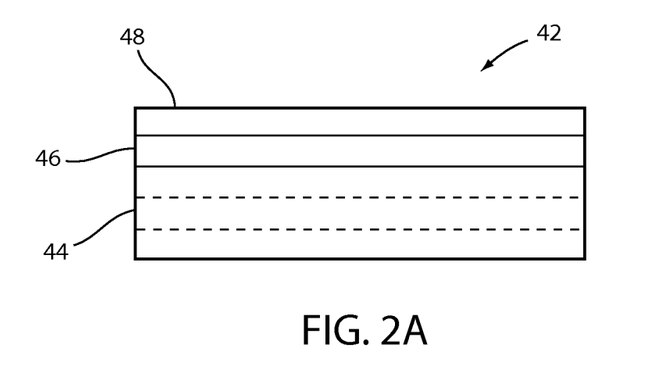
FIG. 2A is a side view of a photoluminescent structure rendered as a coating.
Figure 2B:
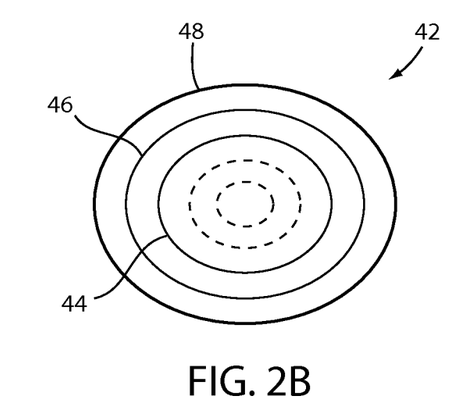
FIG. 2B a side view of a photoluminescent structure rendered as a discrete particle.
Figure 2C:
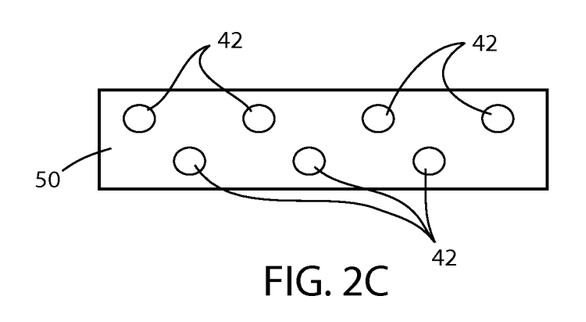
FIG. 2C a side view of a plurality photoluminescent structures rendered as discrete particles and incorporated into a separate structure.

Referring to FIGS. 2A-2C, a photoluminescent structure 42 is generally shown rendered as a coating (e.g. a film) capable of being applied to a vehicle fixture, a discrete particle capable of being implanted in a vehicle fixture, and a plurality of discrete particles incorporated into a separate structure capable of being applied to a vehicle fixture, respectively. The photoluminescent structure 42 may correspond to the photoluminescent portions as discussed herein, for example the first photoluminescent portion 28 and the second photoluminescent portion 30. At the most basic level, the photoluminescent structure 42 includes an energy conversion layer 44 that may be provided as a single layer or a multilayer structure, as shown through broken lines in FIGS. 2A and 2B.

The energy conversion layer 44 may include one or more photoluminescent materials having energy converting elements selected from a phosphorescent or a fluorescent material. The photoluminescent materials may be formulated to convert an inputted electromagnetic radiation into an outputted electromagnetic radiation generally having a longer wavelength and expressing a color that is not characteristic of the inputted electromagnetic radiation. The difference in wavelength between the inputted and outputted electromagnetic radiations is referred to as the Stokes shift and serves as the principle driving mechanism for an energy conversion process corresponding to a change in wavelength of light, often referred to as down conversion. In the various implementations discussed herein, each of the wavelengths of light (e.g. the first wavelength, etc.) correspond to electromagnetic radiation utilized in the conversion process.

Each of the photoluminescent portions may comprise at least one photoluminescent structure 42 comprising an energy conversion layer (e.g. conversion layer 44). The energy conversion layer 44 may be prepared by dispersing the photoluminescent material in a polymer matrix 50 to form a homogenous mixture using a variety of methods. Such methods may include preparing the energy conversion layer 44 from a formulation in a liquid carrier medium and coating the energy conversion layer 44 to a desired planar and/or non-planar substrate of a vehicle fixture. The energy conversion layer 44 coating may be deposited on a vehicle fixture by painting, screen printing, spraying, slot coating, dip coating, roller coating, and bar coating. Additionally, the energy conversion layer 44 may be prepared by methods that do not use a liquid carrier medium.

For example, a solid state solution (homogenous mixture in a dry state) of one or more photoluminescent materials may be incorporated in a polymer matrix 50 to provide the energy conversion layer 44. The polymer matrix 50 may be formed by extrusion, injection molding, compression molding, calendaring, thermoforming, etc. In instances where one or more energy conversion layers 44 are rendered as particles, the single or multi-layered energy conversion layers 44 may be implanted into a vehicle fixture or panel. When the energy conversion layer 44 includes a multilayer formulation, each layer may be sequentially coated. Additionally, the layers can be separately prepared and later laminated or embossed together to form an integral layer. The layers may also be coextruded to prepare an integrated multilayered energy conversion structure.

Referring back to FIGS. 2A and 2B, the photoluminescent structure 42 may optionally include at least one stability layer 46 to protect the photoluminescent material contained within the energy conversion layer 44 from photolytic and thermal degradation. The stability layer 46 may be configured as a separate layer optically coupled and adhered to the energy conversion layer 44. The stability layer 46 may also be integrated with the energy conversion layer 44. The photoluminescent structure 42 may also optionally include a protective layer 48 optically coupled and adhered to the stability layer 46 or any layer or coating to protect the photoluminescent structure 42 from physical and chemical damage arising from environmental exposure.

The stability layer 46 and/or the protective layer 48 may be combined with the energy conversion layer 44 to form an integrated photoluminescent structure 42 through sequential coating or printing of each layer, or by sequential lamination or embossing. Alternatively, several layers may be combined by sequential coating, lamination, or embossing to form a substructure. The substructure may then be laminated or embossed to form the integrated photoluminescent structure 42. Once formed, the photoluminescent structure 42 may be applied to a chosen vehicle fixture.

In some implementations, the photoluminescent structure 42 may be incorporated into a vehicle fixture as one or more discrete multilayered particles as shown in FIG. 2C. The photoluminescent structure 42 may also be provided as one or more discrete multilayered particles dispersed in a polymer formulation that is subsequently applied to a vehicle fixture or panel as a contiguous structure. Additional information regarding the construction of photoluminescent structures to be utilized in at least one photoluminescent portion of a vehicle is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference.

Figure 3:
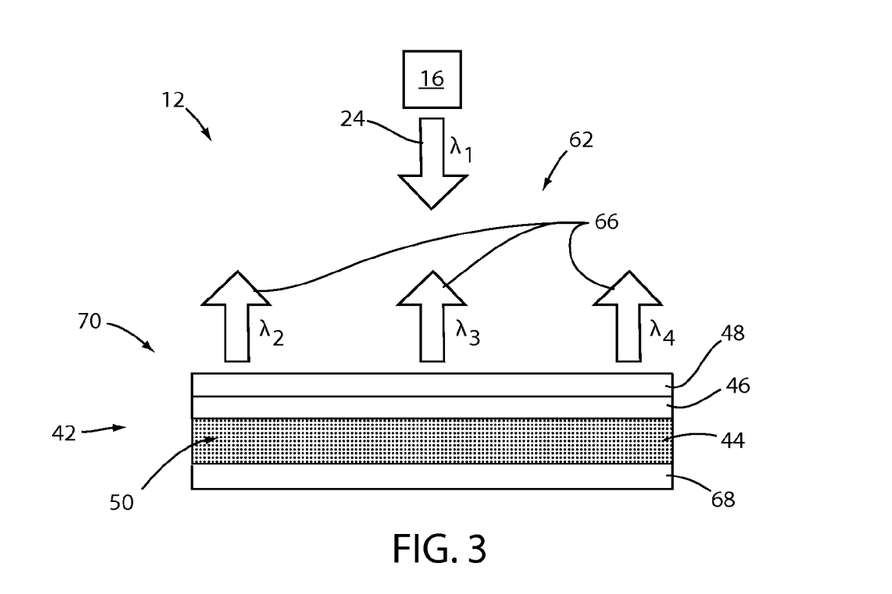
FIG. 3 illustrates a vehicle lighting system configured to convert a first emission of light to a second emission of light.

Referring to FIG. 3, the lighting system 12 is generally shown according to a front-lit configuration 62 to convert the first emission 24 from the light source 16 to the second emission 26. The first emission 24 comprises a first wavelength $\lambda_1$, and the second emission 26 comprises a second wavelength $\lambda_2$. The lighting system 12 may include the photoluminescent structure 42 rendered as a coating and applied to a substrate 68 of a vehicle fixture 70. The photoluminescent structure 42 may include the energy conversion layer 44, and in some implementations may include the stability layer 46 and/or protective layer 48. In response to the light source 16 being activated, the first emission 24 is converted from the first wavelength $\lambda_1$ to the second emission 26 having at least the second wavelength $\lambda_2$. The second emission 26 may comprise a plurality of wavelengths $\lambda_2$, $\lambda_3$, $\lambda_4$ configured to emit significantly white light from the vehicle fixture 70.

In various implementations, the lighting system 12 comprises at least one energy conversion layer 44 configured to convert the first emission 24 at the first wavelength $\lambda_1$ to the second emission 26 having at least the second wavelength $\lambda_2$. In order to generate the plurality of wavelengths $\lambda_2$, $\lambda_3$, $\lambda_4$, the energy conversion layer 44 may comprise a red-emitting photoluminescent material, a green-emitting photoluminescent material, and a blue-emitting photoluminescent material dispersed in the polymer matrix 50. The red, green, and blue-emitting photoluminescent materials may be combined to generate the significantly white light for the second emission 26. Further, the red, green, and blue-emitting photoluminescent materials may be utilized in a variety of proportions and combinations to control the color of the second emission 26.

Each of the photoluminescent materials may vary in output intensity, output wavelength, and peak absorption wavelengths based on a particular photochemical structure and combinations of photochemical structures utilized in the energy conversion layer 44. As an example, the second emission 26 may be changed by adjusting the wavelength of the first emission $\lambda_1$ to activate the photoluminescent materials at different intensities to alter the color of the second emission 26. In addition to or alternatively to the red, green, and blue-emitting photoluminescent materials, other photoluminescent materials may be utilized alone and in various combinations to generate the second emission 26 in a wide variety of colors. In this way, the lighting system 12 may be configured for a variety of applications to provide a desired lighting color and effect for the vehicle 10.

The light source 16 may also be referred to as an excitation source and is operable to emit at least the first emission 24. The light source 16 may comprise any form of light source, for example halogen lighting, fluorescent lighting, light emitting diodes (LEDs), organic LEDs (OLEDs), polymer LEDs (PLEDs), solid state lighting or any other form of lighting configured to output the first emission 24. The first emission 24 from the light source 16 may be configured such that the first wavelength $\lambda_1$ corresponds to at least one absorption wavelength of the one or more photoluminescent materials of the energy conversion layer 44. In response to receiving the light at the first wavelength $\lambda_1$, the energy conversion layer 44 may be excited and output the one or more output wavelengths $\lambda_2$, $\lambda_3$, $\lambda_4$. The first emission 24 provides an excitation source for the energy conversion layer 44 by targeting absorption wavelengths of the various photoluminescent materials utilized therein. As such, the lighting system 12 is configured to output the second emission 26 to generate a desired light intensity and color.

Though the plurality to wavelengths is referred to as the wavelengths $\lambda_2$, $\lambda_3$, $\lambda_4$, the photoluminescent materials may be combined in various proportions, types, layers, etc. to generate a variety of colors for the second emission 26. The photoluminescent materials may also be utilized in a plurality of photoluminescent portions distributed along a path of the first emission 24 to generate any number of emissions, for example a third emission, a fourth emission, etc. The third emission may be emitted from the second photoluminescent portion 30 and the fourth emission may be emitted from a third photoluminescent portion disposed on the vehicle 10.

In an exemplary implementation, the light source 16 comprises an LED configured to emit the first wavelength $\lambda_1$ which corresponds to a blue spectral color range. The blue spectral color range comprises a range of wavelengths generally expressed as blue light (~440-500 nm). In some implementations, the first wavelength $\lambda_1$ may also comprise wavelengths in a near ultraviolet color range (~390-450 nm). In an exemplary implementation, $\lambda_1$ may be approximately equal to 470 nm. In some implementations, the first wavelength $\lambda_1$ may be approximately less than 500 nm such that the first wavelength of the light is not significantly visible.

The blue spectral color range and shorter wavelengths may be utilized as an excitation source for the lighting system 12 due to these wavelengths having limited perceptual acuity in the visible spectrum of the human eye. By utilizing shorter wavelengths for the first wavelength $\lambda_1$, and converting the first wavelength with the conversion layer 44 to at least one longer wavelength, the lighting system 12 creates a visual effect of light originating from the photoluminescent structure 42. In this configuration, light is emitted from the photoluminescent structure 42 (e.g. the first photoluminescent portion 28, the second photoluminescent portion 30) from locations of the vehicle 10 that may be inaccessible or costly to add conventional light sources requiring electrical connections.

As discussed herein, each of the plurality of wavelengths $\lambda_2$, $\lambda_3$, $\lambda_4$ may correspond to a significantly different spectral color range. The second wavelength $\lambda_2$ may correspond to the excitation of a red-emitting photoluminescent material having a wavelength of approximately 620-750 nm. The third wavelength $\lambda_3$ may correspond to the excitation of a green emitting photoluminescent material having a wavelength of approximately 526-606 nm. The fourth wavelength $\lambda_4$ may correspond to a blue or blue green emitting photo luminescent material having a wavelength longer than the first wavelength $\lambda_1$ and approximately 430-525 nm. Though the wavelengths $\lambda_2$, $\lambda_3$, $\lambda_4$ are discussed herein as being utilized to generate a significantly white light, various combinations of photoluminescent materials may be utilized in the conversion layer 44 to convert the first wavelength $\lambda_1$ to one or more wavelengths corresponding to a variety of colors.

Figure 4:
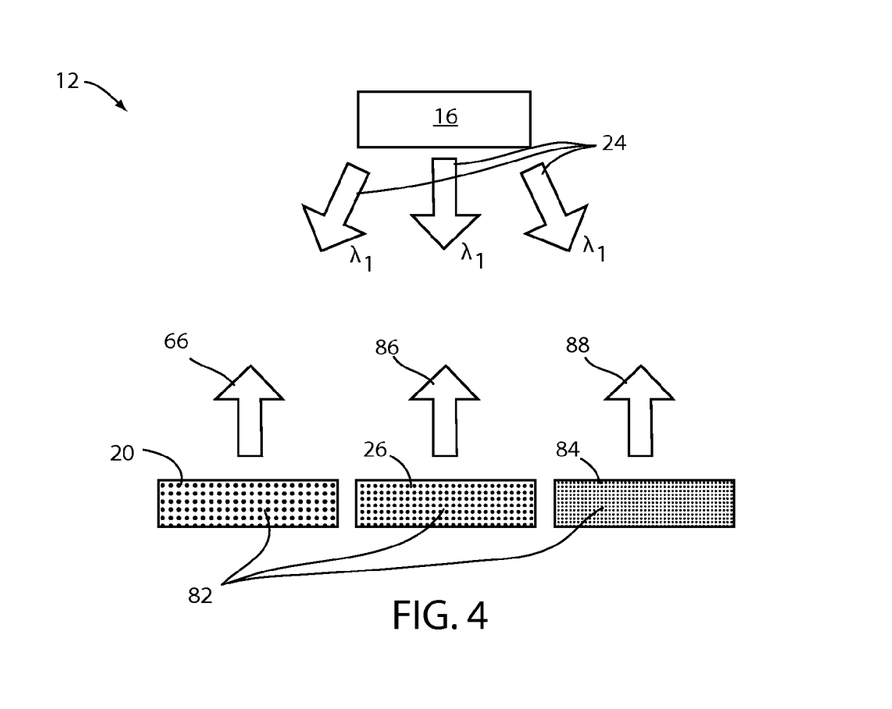
FIG. 4 illustrates the vehicle lighting system configured to convert a first emission of light to a plurality of emissions of light.

Referring to FIG. 4, the lighting system 12 is shown in a front-lit configuration. In an exemplary implementation, the light source 16 may be configured to emit the first emission 24 toward the plurality of photoluminescent portions 82. In this example, the plurality of photoluminescent portions 22 comprises the first photoluminescent portion 28, the second photoluminescent portion 30, and a third photoluminescent portion 84. Each of the photoluminescent portions 28, 30, 84 may be configured to convert the first wavelength $\lambda_1$ of the first emission 24 to one or more of the plurality of wavelengths $\lambda_2$, $\lambda_3$, $\lambda_4$. In this way, the first emission 24 may be converted into a plurality of emissions originating from each of the photoluminescent portions 82 to generate a multicolored lighting effect.

For example, the first photoluminescent portion 28 may comprise photoluminescent materials in a conversion layer configured to generate the second emission 26. The second photoluminescent portion 30 may comprise photoluminescent materials in a conversion layer configured to generate a third emission 86. The third photoluminescent portion 84 may comprise photoluminescent materials in a conversion layer configured to generate a fourth emission 88. Similar to the energy conversion layer 44, discussed in reference to FIG. 3, photoluminescent materials configured to emit light of various colors may be utilized in a variety of proportions and combinations to control the output color of each of the second emission 66, the third emission 86, and the fourth emission 88. Based on a desired lighting effect, each of the emissions 26, 86, 88 may comprise photoluminescent material configured to emit light having substantially similar colors, or a wide variety of color combinations.

To achieve the various colors and combinations of photoluminescent materials described herein, the lighting system 12 may utilize any form of photoluminescent materials, for example phospholuminescent materials, organic and inorganic dyes, etc. For additional information regarding fabrication and utilization of photoluminescent materials to achieve various emissions, refer to U.S. Pat. No. 8,207,511 to Bortz et al., entitled "PHOTOLUMINESCENT FIBERS, COMPOSITIONS AND FABRICS MADE THEREFROM," filed Jun. 5, 2009; U.S. Pat. No. 8,247,761 to Agrawal et al., entitled "PHOTOLUMINESCENT MARKINGS WITH FUNCTIONAL OVERLAYERS," filed Oct. 19, 2011; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Mar. 4, 2013; U.S. Pat. No. 8,664,624 B2 to Kingsley et al., entitled "ILLUMINATION DELIVERY SYSTEM FOR GENERATING SUSTAINED SECONDARY EMISSION," filed Nov. 14, 2012; U.S. Patent Publication No. 2012/0183677 to Agrawal et al., entitled "PHOTOLUMINESCENT COMPOSITIONS, METHODS OF MANUFACTURE AND NOVEL USES," filed Mar. 29, 2012; U.S. Patent Publication No. 2014/0065442 A1 to Kingsley et al., entitled "PHOTOLUMINESCENT OBJECTS," filed Oct. 23, 2012; and U.S. Patent Publication No. 2014/0103258 A1 to Agrawal et al., entitled "CHROMIC LUMINESCENT COMPOSITIONS AND TEXTILES," filed Dec. 19, 2013, all of which are incorporated herein by reference in their entirety.

Figure 5:
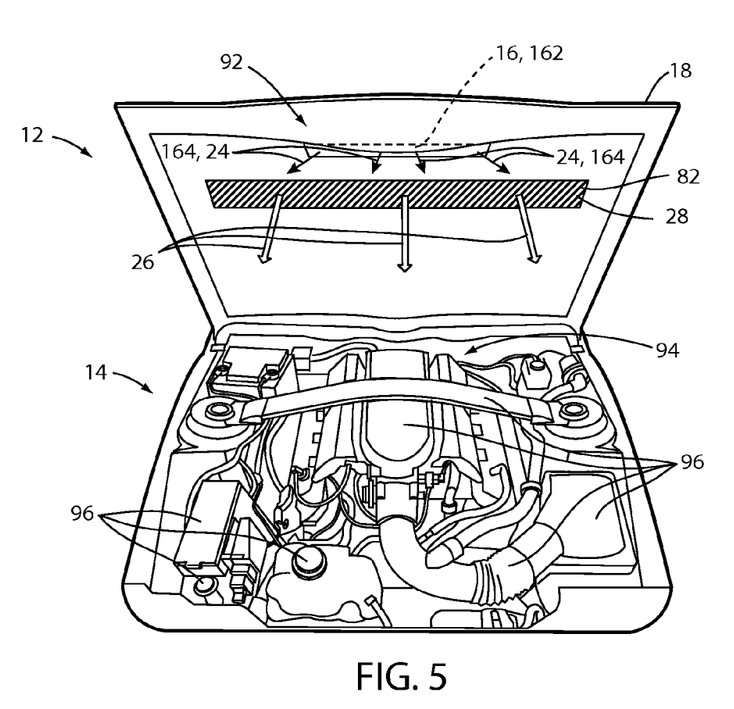
FIG. 5 is a perspective view of a vehicle having a lighting system configured to illuminate an engine compartment.
Figure 6:
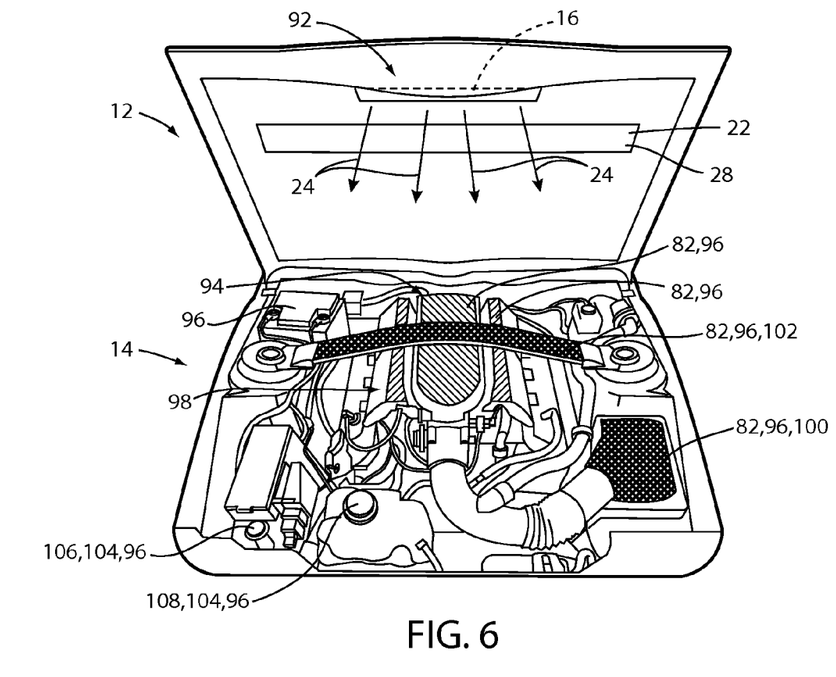
FIG. 6 is a perspective view of a vehicle having a lighting system configured to illuminate at least one engine component in an engine compartment.

Referring to FIGS. 5 and 6, the engine compartment 14 of the vehicle 10 is shown demonstrating the plurality of photoluminescent portions 22. For clarity, the first photoluminescent portion 28 disposed on the interior surface 17 is shown in reference to FIG. 5 and the plurality of photoluminescent portions 82 disposed in the engine compartment 14 are shown in FIG. 6. It shall be understood that the photoluminescent portions 82 as discussed herein may be distributed in any configuration throughout the interior surface 17 of the closure 18 and the engine compartment 14. As discussed herein, the first photoluminescent portion 28 may be configured as a utility light 32 to illuminate the engine compartment 14 for maintenance and inspection. In response to the closure 18 being oriented in an open position, a lighting control module of the vehicle 10 may be configured to activate the light source 16. Further, in response to the activation of the light source 16, the first emission 24 may be activated to emit light having the first wavelength $\lambda_1$.

The light source 16 may comprise a plurality of LEDs configured to emit the first emission at the first wavelength $\lambda_1$. In some implementations, the light source 16 may comprise an array of LEDs located proximate a forward portion 92 of the closure 18. By positioning the light source 16 proximate the forward portion 92, the light source 16 may experience a lower intensity of heat during operation of the vehicle 10. For example, when the closure 18 is oriented in a closed position, the light source 16 may be located proximate a radiator or cooling source of the engine such that the light source 16 is not damaged by heat radiating from an engine compartment 14 of the vehicle 10.

As illustrated in FIG. 5, the light source 16 is configured to direct the first emission 24 substantially toward the first photoluminescent portion 28. Further, the first emission 24 may be directed downward toward the engine compartment 14 when the closure 18 is oriented in the open position. For example, the light source 16 may be connected to the interior surface 17 such that the first emission is directed substantially downward, focused centrally at the engine compartment 14. The light source 16 may further be configured to project the first emission 24 toward the first photoluminescent portion 28 and the engine compartment 14 via one or more optic lenses or devices. In this configuration, the first emission 24 at the first wavelength $\lambda_1$ is emitted from the light source 16 to substantially illuminate the first photoluminescent portion 28 disposed on the closure 18 to illuminate the engine compartment 14.

Though the first emission may be directed through a substantially open volumetric space between the closure 18 and the engine compartment 14, the illumination of the light at the first wavelength $\lambda_1$ may be limited perceptually. The limited visible or perceptible illumination of the first wavelength $\lambda_1$ may be due to the first wavelength $\lambda_1$ being in the blue or near UV spectral color ranges. Due to the limited sensitivity of the human eye to light at such short wavelengths (e.g. blue colored light), the first emission may go unnoticed to an onlooker of the lighting system 12. In this way, each of the plurality of photoluminescent portions 22 may be illuminated such that the activation source of the photoluminescent portions 22 is not apparent to provide a sophisticated ambient lighting experience.

In response to the first wavelength $\lambda_1$ of the first emission 24 being received by the first photoluminescent portion 28, the energy conversion layer 44 may become excited and emit the second emission 26. As discussed previously herein, the second emission 26 may comprise a plurality of wavelengths $\lambda_2$, $\lambda_3$, $\lambda_4$ to generate a significantly white light. The second emission 26 is generally directed toward the engine compartment 14 such that a plurality of features 96 is illuminated. The utility light 32 configuration of the first photoluminescent portion 28 may provide uniform lighting throughout the engine compartment 14.

Referring now to FIG. 6, the first emission 24 is further directed from the light source 16 downward into the engine compartment 14 to excite a conversion layer 44 in one or more photoluminescent portions 82 applied as a coating to and/or disposed in a matrix (e.g. the polymer matrix 50) of any number of the plurality of features 96. For example, the second photoluminescent portion 30 may be incorporated in an engine cover 98; the third photoluminescent portion 84 may be incorporated in an air intake 100 and a strut tower brace 102. In response to receiving the first emission 24 comprising the first wavelength $\lambda_1$, each of the plurality of photoluminescent portions 82 may become excited. The excitation may cause the second photoluminescent portion 30 to emit the third emission 86 and the third photoluminescent portion 84 to emit the fourth emission 88. For clarity, various details corresponding to the first photoluminescent portion 28 are suppressed in FIG. 6.

Though the plurality of photoluminescent portions 82 are specifically discussed in reference to three exemplary portions, the plurality of photoluminescent portions 82 may corresponds to any number of portions proximate the engine compartment according to other embodiments. Each of the plurality of photoluminescent portions 82 may further include various energy conversion layers including various photoluminescent materials configured to emit a wide variety of colors in response to the first emission 24. As such, the lighting system 12 may be utilized in a variety of settings to provide the utility light 32 and/or illuminate and accent any number of features 96.

The plurality of features 96 may comprise any feature related to the vehicle 10 that may be disposed generally proximate the engine compartment 14 and the closure 18. Any of the plurality of features 96 may incorporate a photoluminescent structure applied as a coating, and/or dispersed in a material structure that may illuminate and emit light in response to receiving the first wavelength $\lambda_1$ of the first emission 24. Each of the photoluminescent portions 82 may be illuminated in a single color or multiple colors to provide a desired color pallet and appearance for illuminating the plurality of features 94. The photoluminescent portions 82 may further be utilized to identify one or more of the plurality of features 94 for easy identification during maintenance.

In some implementations, at least one fluid fill cap 104, dip stick, or any other feature 94 may comprise at least one photoluminescent structure 42 configured to emit an emission (e.g. the third emission 86, fourth emission 88, etc.) comprising an identifying color. The identifying color may be emitted in response to the feature 94 receiving the first emission 24. The identifying color may be configured to correspond to a color described in a vehicle user manual or maintenance instructions. In some implementations, the plurality of the photoluminescent portions 82 may correspond to a plurality of identifying colors configured to identify, categorize, and/or provide for a first feature 106 having a first color to be visually discernible from a second feature 108 having a second color. In this way, the lighting system may provide additional utility by providing decorative lighting that may serve to aid in identifying various features 94 located proximate the engine compartment 14.

Figure 7:
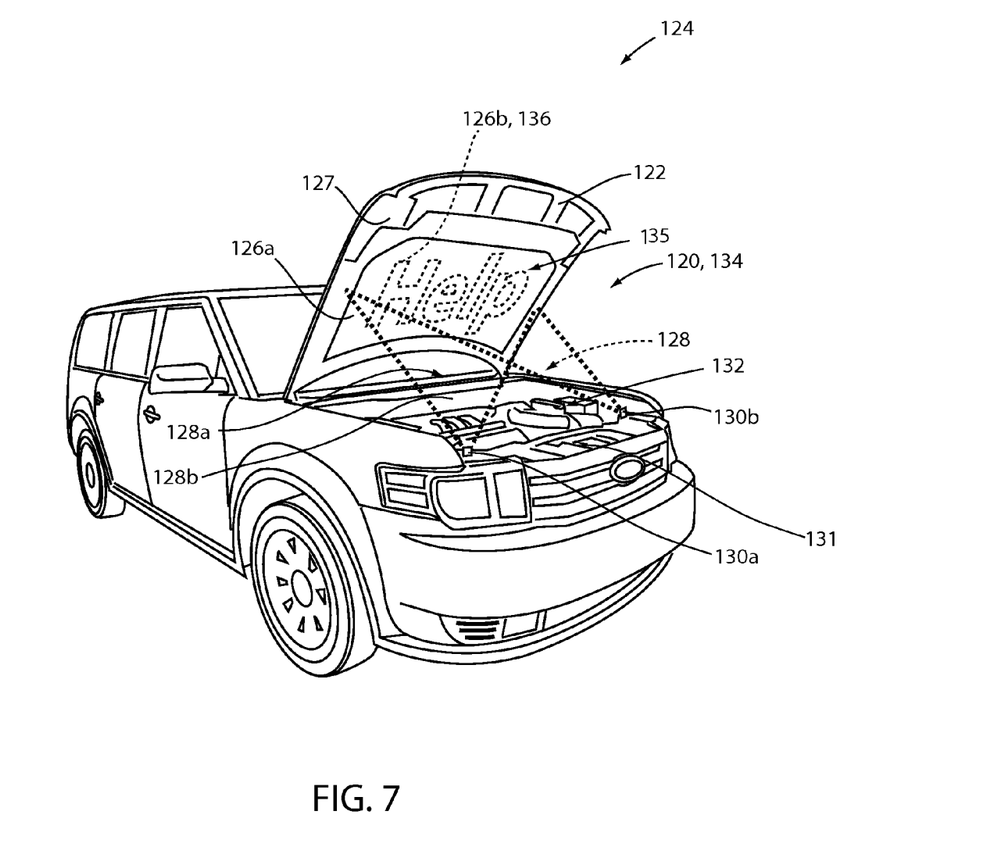
FIG. 7 is a perspective view of a vehicle having a lighting system disposed proximate a closure of a vehicle.

Referring now to FIG. 7, a lighting system 120 is shown disposed proximate a closure 122 of a vehicle 124. In some embodiments, the closure 122 may correspond to a vehicle hood or a decklid for a trunk. The lighting system 120 may incorporate similar elements and features to the lighting system 12. The lighting system 120 may comprise a controller in communication with a vehicle control module and/or a user interface, for example a human machine interface (HMI). In response to an input from the vehicle control module or the user interface, the controller is operable to selectively illuminate at least one photoluminescent portion 126 disposed on the on an interior surface 127 of the closure 122. As shown in FIG. 7, the photoluminescent portion may be disposed on a hood insulator connected to the interior surface 127. Similar to the lighting system 12, the lighting system 120 may illuminate the by emitting an excitation emission 128 from at least one light source 130 disposed proximate an outer portion 131 or access region of a vehicle compartment, for example an engine compartment 132.

In some implementations, the at least one photoluminescent portion 126 may comprise a first photoluminescent portion 126a and a second photoluminescent portion 126b. As shown in FIG. 7, the first photoluminescent portion 126a may correspond to a utility light 134 and the second photoluminescent portion 126b may correspond to a graphic 135. The graphic 135 may correspond to lettering, symbols, figures, designs, shapes, or any other form of graphic. In an exemplary embodiment, the graphic 135 may correspond to a distress message that may be selectively activated by the controller in the event of an emergency.

The at least one light source 130 may correspond to a first light source 130a and a second light source 130b. The light sources 130a, 130b may be selectively activated to output at least one output emission from one of the first photoluminescent portion 126a and the second photoluminescent portion 126b. Each of the light sources 130a and 130b may comprise a first emitter and a second emitter. The first emitter may be configured to output a first excitation emission 128a and the second emitter may be configured to output a second excitation emission 128b. Each of the excitation emissions 128a, 128b may correspond to an absorption range of one or more photoluminescent materials disposed in the first photoluminescent portion 126a and the second photoluminescent portion 126b, respectively. In this configuration, the lighting system 120 may be operable to illuminate the first photoluminescent portion 126a and the second photoluminescent portion 126b substantially independently.

In order to provide for substantially independent illumination of the photoluminescent portions 126a, 126b, the corresponding energy conversion layers may be configured to have excitation absorption ranges corresponding to a wavelength of the first excitation emission 128a and the second excitation emission 128b, respectively. For example, specific photoluminescent materials may be selected such that the first photoluminescent portion 126a comprises a first peak absorption at a wavelength of approximately 480 nm. Photoluminescent materials may also be selected such that the second photoluminescent portion 126b comprises a second peak absorption at a wavelength of approximately 440 nm. In this configuration, the system 132 may be configured to selectively illuminate the first photoluminescent portion 126a and the second photoluminescent portion 126b substantially independently. Though the specific wavelengths of 440 nm and 480 nm are discussed in reference to the present implementation, it shall be understood that photoluminescent materials having various absorption ranges may be utilized to adjust the absorption ranges of the photoluminescent portions 126.

Each of the emitters may correspond to one of more LED emitters configured to selectively emit the first excitation emission 128a or the second excitation emission 128b. The first excitation emission 128a may be configured to emit a wavelength of light substantially aligned with the first peak absorption at a wavelength of approximately 480 nm. The second excitation emission 128b may be configured to emit a wavelength substantially aligned with the second peak absorption at a wavelength of approximately 440 nm. In this configuration, the controller may be operable to selectively activate the first emitter and/or the second emitter of the at least one light source 130 to selectively emit the first excitation emission 128a and/or the second excitation emission 128b. In this way, the system 120 may provide for the controller to be operable to selectively illuminate the first photoluminescent portion 126a and/or the second photoluminescent portion 126b.

Though the excitation emissions 128 are referred to as specific wavelengths of energy, each of the excitation emissions may be configured to selectively activate one or more photoluminescent materials disposed in the first photoluminescent portion 126a or the second photoluminescent portion 126b. The excitation emissions 128 may be in the blue spectral color range comprising a range of wavelengths generally expressed as blue light (~440-500 nm). In some implementations, the wavelengths corresponding to one or more of the excitation emissions 128 may comprise wavelengths in a near ultraviolet color range (~390-450 nm). In some implementations, each of the excitation emissions 128 may be approximately less than 500 nm such that the excitation emissions 128 are not significantly visible. Though the emitters of the light sources are referred to as LED emitters, each of the emitters may correspond to any form of light source, for example halogen lighting, fluorescent lighting, light emitting diodes (LEDs), organic LEDs (OLEDs), polymer LEDs (PLEDs), solid state lighting or any other form of lighting configured to output the excitation emissions 128.

In some embodiments, the lighting system 120 may further be operable activate each of the photoluminescent portions 126 to emit light at a plurality of intensities. For example, the controller may be operable to adjust an intensity of an excitation emission 128 output from the at least one light source 130. The intensity of the excitation emission 128 may be adjusted by varying a magnitude and/or a duty cycle of the voltage/current supplied to the one or more corresponding emitters. In some embodiments, the at least one light source 130 may comprise at least one LED emitter.

The LED emitter may be operable to vary in intensity. In an exemplary implementation, the controller may be operable to drive the LED light source at a first intensity within a normal operating range for an LED emitter. Additionally, the controller may be operable to drive the light source at a second intensity that may exceed the normal operating range and have a higher intensity than the first intensity. As described herein, a normal operating range for an LED emitter may correspond to a full duty cycle and operating temperatures less a threshold temperate (e.g. approximately 45 C). At temperatures less than the threshold temperature, the controller may operate the light source at the first intensity or the second intensity.

The operating temperature of the at least one light source 130 may be identified as an ambient temperature proximate the light source 130 via a thermometer or any temperature measuring device that may be in communication with the controller. If the controller identifies that the operating temperature is exceeding threshold temperature, the controller may only operate the light source at the first intensity and suppress operation at the second intensity. The second intensity of an excitation emission may be applied to excite the photoluminescent portion 126 such that an output emission 136 emitted from the photoluminescent portion 126 may illuminate at least a portion of a surface located forward of the vehicle 124 in a utility configuration. Though the lighting system 120 is illustrated as a hood of the vehicle 124, the lighting system may be implemented in a closure, for example a decklid for a trunk or luggage compartment.

In some implementations, each of the photoluminescent portions discussed herein (e.g. 126) may comprise an organic or inorganic fluorescent dye configured to convert the excitation emission 128 to the output emission 136. For example, the photoluminescent portions 126 may comprise a photoluminescent structure of rylenes, xanthenes, porphyrins, phthalocyanines, or other materials suited to a particular Stoke shift defined by the first absorption range and emission fluorescence. In some embodiments, the photoluminescent portions 126 may be of at least one inorganic luminescent material selected from the group of phosphors. The inorganic luminescent material may more particularly be from the group of Ce-doped garnets, such as YAG:Ce. As such, each of the photoluminescent portions 126 may be selectively activated by a wide range of wavelengths received from the excitation emission 128 configured to excite a specific photoluminescent material and emit an output emission having a desired color.

Figure 8:
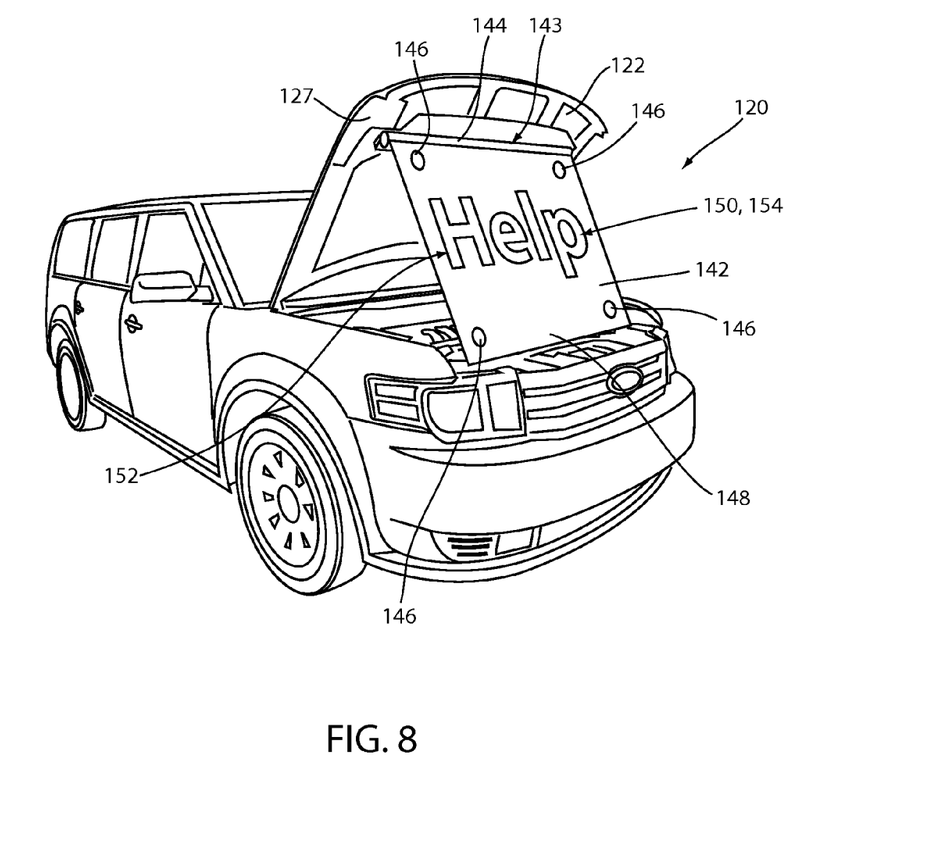
FIG. 8 is a perspective view of a vehicle having a lighting system incorporating a shade that may be implemented as a removable or retractable sign.

Referring now to FIG. 8, the lighting system 120 is shown incorporating a shade 142 that may be implemented as a removable or retractable sign. The shade may be removably connected to the inner surface 127 of the closure 122, or in some embodiments may be retracted into a housing 143. The housing may be connected to the inner surface 127 and/or integrated as a portion of the closure 122. The shade 142 may be of a variety of materials, for example polymeric, metallic, etc. In some implementations, the shade 142 may be flexible and retained in an extended position (as shown) by a retractable spring assembly 144 and one or more connecting elements 146. In some implementations, the shade 142 may be of a significantly rigid material or a substantially flexible material that may be secured to the vehicle 124 by connecting elements and arranged proximate the engine compartment 132. In any of the arrangements for positioning the shade proximate the engine compartment, the shade 142 may be arranged such that the output emission 136 from at least one of the photoluminescent portions 126 impinges upon a masking surface 148 of the shade 142.

The shade 142 may comprise one or more graphics 150 and/or characters, masked, cutout, or removed from the masking surface 148 to form a cutout portion 152. Though referred to as a cutout portion, the graphics 150 or characters may correspond to a portion having increased or decreased transmissivity relative the masking surface 148. In each of the illustrative implementations of the shade 142 discussed herein, the one or more graphics 150 may be configured to have a contrasting level of light transmissivity of the masking surface 148 relative to the graphics. In this way, the output emission 136 emitted from at least one of the photoluminescent portions 126 may illuminate the graphics 150 or an outline of the graphics 150 such that the graphics 150 are visible and illuminated.

The one or more graphics 150 and/or characters may correspond to a message 154 which may be illuminated in a backlit configuration. The message may be in the form of a symbol, for example a hazard symbol, a word, and/or various symbols. As shown in FIG. 8, the message forms the word, "help," displayed as a distress message that may be displayed to alert others of an emergency. In some implementations, the shade may be interchangeable such that one of a plurality t of symbols or messages may be illuminated on the shade 142. In this way, the lighting system 120 provides for messages to be displayed when the hood or any closure 122 of the vehicle 124 oriented in the open position.

Figure 9:
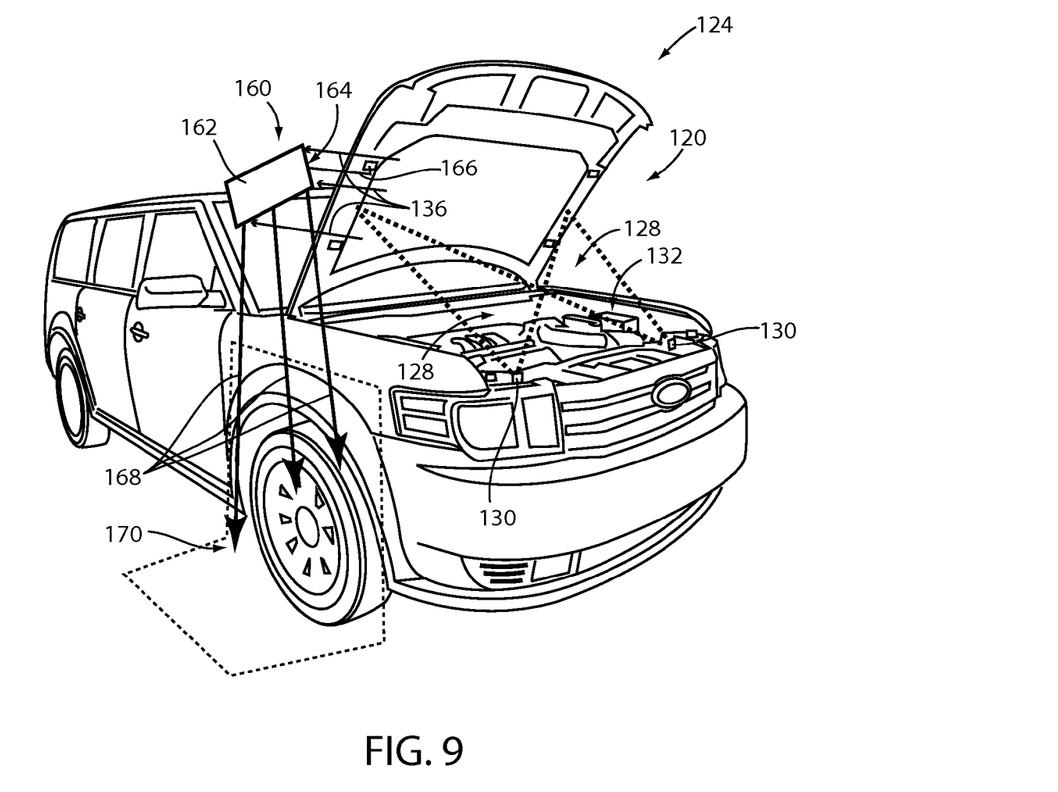
FIG. 9 is a perspective view of a vehicle having a lighting system incorporating an adjustable light transmitting assembly.

Referring now to FIG. 9, the lighting system 120 is shown incorporating an adjustable light transmitting assembly 160. The assembly 160 may comprise a reflector 162 or an adjustable photoluminescent portion 164 disposed on an adjustable bracket 166. In the various implementations discussed herein, the adjustable bracket 166 may be configured in a quick-connection configuration to one or more brackets disposed proximate the engine compartment 132. In this configuration, the light transmitting assembly 160 may be adjustably arranged to provide lighting to a variety of locations proximate the vehicle 124. For example, as illustrated in FIG. 9, the assembly 160 is arranged such that an adjustable output emission 168 of light is directed toward a wheel well 170 of the vehicle 124.

In some embodiments, the reflector 162 may be utilized to reflect a portion of the output emission 136 emitted from at least one of the photoluminescent portions 126. In such implementations, the output emission 136 is received having been converted from the excitation emission 128. In some embodiments, the adjustable photoluminescent portion 164 may be utilized to receive the excitation emission 128 from at least one or the light sources 130. In response to receiving the excitation emission 128, the adjustable photoluminescent portion 164 may convert the excitation emission 128 to an adjustable output emission 168 that may be projected to illuminate a variety of features located proximate the vehicle 124. The various implementations of the adjustable light transmitting assembly 160 may provide for the light sources 130 to be utilized to illuminate numerous regions located proximate the vehicle 124. Such regions may be proximate the hood and/or the trunk of the vehicle 124 and provide beneficial task lighting to simplify maintenance of the vehicle 124 and improve safety.

Figure 10:
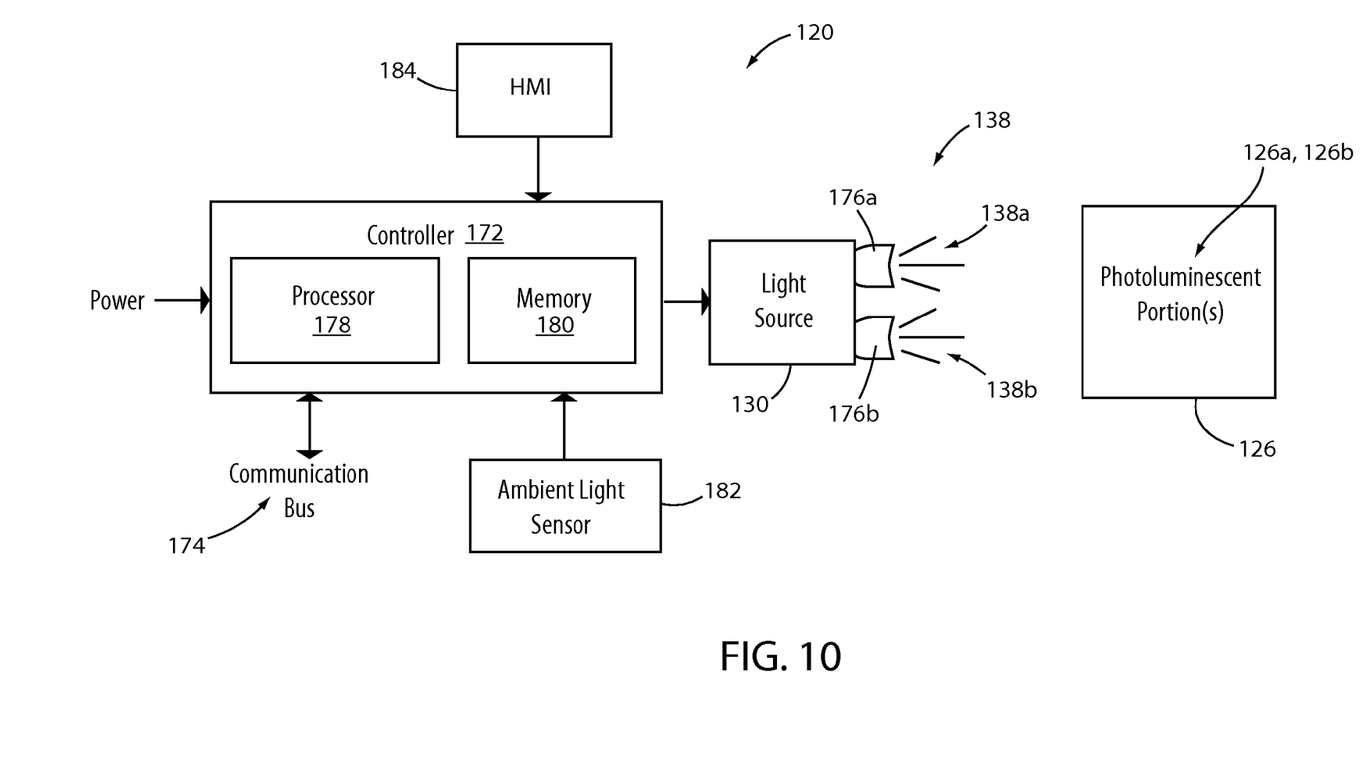
FIG. 10 is a block diagram of a lighting system in communication with a vehicle control module and configured to selectively illuminate at least one feature disposed proximate an engine compartment in accordance with the disclosure.

Referring now to FIG. 10 a block diagram of the lighting system 120 is shown demonstrating the controller 172 configured to control the illumination of the at least one light source 130 to illuminate the photoluminescent portions 126. The controller 172 may be in communication with a communication bus 174 of the vehicle. The communication bus 174 may be configured to deliver signals to the controller 172 identifying various vehicle states. For example, the communication bus 174 may be configured to communicate to the controller 172 a drive selection of the vehicle, an ignition state, a hazard or indicator signal, a remote activation of the light source 16, or any other information or control signals that may be utilized to control or adjust the illumination of the lighting system 120.

The controller 172 may be configured to receive at least one signal identifying a rate, intensity, and/or amplitude of each of the operating conditions. Such signals may be communicated to the controller 172 via various vehicle systems, for example, a tachometer, a temperature gauge, a speedometer, etc. In this configuration, the controller 172 of the lighting system 120 may be configured to provide information to an operator of the vehicle 124 corresponding to an operating condition (e.g. the rate of engine operation, the engine temperature, the vehicle speed, a status of a turn indicator, etc.) by selectively illuminating a first emitter 176a or the second emitter 176b of the light source 130. In this configuration, the controller 172 is operable to selectively activate the first emitter 176a and the second emitter 176b to illuminate the first photoluminescent element 126a and the second photoluminescent element 126b, substantially independently.

The controller 172 may comprise a processor 178 comprising one or more circuits configured to receive the signals from the communication bus 174 and output signals to control the light source 130 to emit the first excitation emission 138a, the second emission 138b and various combinations thereof. The processor 178 may be in communication with a memory 180 configured to store instructions to control the activation of the light source 130. The controller 172 may further be in communication with an ambient light sensor 182. The ambient light sensor 182 may be operable to communicate a light condition, for example a level brightness or intensity of the ambient light proximate the vehicle 124. In response to the level of the ambient light, the controller 172 may be configured to adjust a light intensity output from one or more emitters 176a, 176b of each of the light sources 130. The intensity of the light output from the light source 130 may be adjusted by controlling a duty cycle, current, or voltage supplied to the light source 130.

In some embodiments, the controller 172 may be in communication with a vehicle control module and/or a user interface via the communication bus 174. The user interface may correspond a human machine interface (HMI) 184. In response to an input from the vehicle control module or the user interface, the controller 172 is operable to selectively illuminate at least one photoluminescent portion 126 disposed on the on an interior surface 127 of the closure 122. Though the controller 172 is discussed in reference to the lighting system 120, the controller 172 may be utilized similarly with the lighting system 12.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A lighting system for a vehicle comprising:
 a photoluminescent portion disposed on an inner surface of a closure of an engine compartment; and
 a light source located proximate the closure, the light source configured to emit an excitation emission at a first wavelength directed toward the photoluminescent portion, wherein the photoluminescent portion is configured to convert the first wavelength to at least a second wavelength longer than the first wavelength,
 a controller configured to selectively illuminate the light source, wherein the controller is configured to illuminate the light source to emit light at a first intensity or a second intensity, wherein the controller is configured to supply an increased voltage at a reduced duty cycle to produce the second intensity relative the first intensity.

2. The lighting system according to claim 1, wherein the closure comprises a hood configured to enclose the engine compartment.

3. The lighting system according to claim 1, wherein the light source is disposed proximate a forward portion of an engine compartment.

4. The lighting system according to claim 1, wherein the second intensity is configured to emit light having an increased brightness.

5. The lighting system according to claim 1, wherein the controller is configured to receive a temperature signal.

6. The lighting system according to claim 5, wherein the controller is configured to suppress the second intensity in response to the temperature signal corresponding to a temperature exceeding a temperature threshold.

7. A lighting system for a compartment of a vehicle comprising:
- at least one photoluminescent portion disposed on an inner surface of an engine closure; and
- at least one light source disposed proximate an outer portion of the compartment and configured to emit light at a first wavelength, wherein the photoluminescent portion is configured to convert the first wavelength to at least a second wavelength longer than the first wavelength, wherein the outer portion corresponds to an access region of the compartment.

8. The lighting system according to claim 7, wherein the photoluminescent portion comprises a coating disposed on at least a portion of a hood insulator.

9. The lighting system according to claim 7, wherein the at least one photoluminescent portion comprises a first photoluminescent portion and a second photoluminescent portion.

10. The lighting system according to claim 9, wherein the at least one light source corresponds to a first emitter configured to excite the first photoluminescent portion and a second emitter configured to excite the second photoluminescent portion.

11. The lighting system according to claim 10, wherein a first excitation emission is configured to illuminate the first photoluminescent portion substantially independent of a second excitation emission configured to illuminate the second photoluminescent portion.

12. A lighting system for a compartment of a vehicle comprising:
- at least one photoluminescent portion disposed on an inner surface of an engine closure;
- at least one light source disposed proximate an outer portion of the compartment and configured to emit light a first wavelength, wherein the photoluminescent portion is configured to convert the first wavelength to at least a second wavelength longer than the first wavelength and emit the second wavelength toward the compartment; and
- a shade configured to extend from the inner surface of the closure to a surface proximate an access region of the compartment.

13. The lighting system according to claim 12, wherein the closure is configured to selectively enclose the compartment.

14. The lighting system according to claim 12, wherein the shade corresponds to a mask operable to pass an output emission from the photoluminescent portion through a cutout portion.

15. The lighting system according to claim 14, wherein the cutout portion forms at least one of a character and a graphic selectively illuminated by the output emission.

* * * * *